United States Patent
Schwab et al.

[11] Patent Number: 6,152,216
[45] Date of Patent: Nov. 28, 2000

[54] EVAPORATOR UNIT

[75] Inventors: Konrad Schwab, Esslingen; Alois Tischler, Aidenbach; Marc Weisser, Owen/T., all of Germany

[73] Assignee: DBB Fuel Cell Engines Gesellschaft mit beschränkter Haftung, Kirchheim/Teck-Mabern, Germany

[21] Appl. No.: 09/417,309

[22] Filed: Oct. 13, 1999

[30] Foreign Application Priority Data

Oct. 13, 1998 [DE] Germany .................. 198 47 213

[51] Int. Cl.⁷ .......................................... F28F 3/08
[52] U.S. Cl. .................. 165/167; 165/153; 159/28.6
[58] Field of Search .................... 165/166, 167, 165/DIG. 916, 153, 140; 159/28.6; 62/515

[56] References Cited

U.S. PATENT DOCUMENTS

| | | | |
|---|---|---|---|
| 4,731,159 | 3/1988 | Porter et al. | 159/28.6 |
| 4,808,262 | 2/1989 | Aneja et al. | 165/166 |
| 5,152,337 | 10/1992 | Kawakatsu et al. | 165/153 |
| 5,453,158 | 9/1995 | Cummings et al. | 165/167 |
| 5,470,431 | 11/1995 | Okuda et al. | 165/153 |
| 5,514,248 | 5/1996 | Okuda et al. | 165/153 |
| 5,937,935 | 8/1999 | Schornhorst et al. | 165/153 |

FOREIGN PATENT DOCUMENTS

4426692 C1  7/1994  Germany .

*Primary Examiner*—Ira S. Lazarus
*Assistant Examiner*—Terrell McKinnon
*Attorney, Agent, or Firm*—Evenson, McKeown, Edwards & Lenahan, P.L.L.C.

[57] ABSTRACT

An evaporator unit in the form of a plate construction has evaporation spaces and heat transfer medium spaces respectively arranged between successive plates. The plates have an essentially circular construction and have recesses for forming inflow and outflow lines for the medium to be evaporated and for a heat transfer medium which extend perpendicularly to the plates. The inflow line for the medium to be evaporated is arranged in the area of the center of the circular plates. The outflow lines for the evaporated medium and for the heat transfer medium are arranged in the circumferential area of the circular plates. For the heat transfer medium, several inflow lines can be provided at a radial distance from the center of the circular plates between the inflow line and the outflow lines for the medium to be evaporated.

6 Claims, 2 Drawing Sheets

EVAPORATOR UNIT

BACKGROUND OF THE INVENTION

This application claims the priority of 198 47 213.7–44, filed Oct. 13, 1998, the disclosure of which is expressly incorporated by reference herein.

The present invention relates to an evaporator unit in a plate-type construction, and more particularly, to an evaporator unit with evaporation spaces and heat transfer medium spaces respectively being formed between successive plates, having inflow and outflow lines for a medium to be evaporated and for a heat transfer medium which extend essentially perpendicularly to the plates.

DE 44 26 692 C1 discloses an evaporator unit which has rectangular plates for evaporating and overheating a liquid medium. The inflow and outflow lines for the medium to be evaporated and for a heat transfer medium, which each extend along the stacking direction through the plate stack, are arranged in the corner areas of the plates.

SUMMARY OF THE INVENTION

An object of the present invention is to provide an evaporator with a lower pressure loss and a higher conversion rate.

According to the present invention, this object has been achieved by providing that the plates have an essentially circular construction, in that the inflow line for the medium to be evaporated is arranged in the area of the center of the circular plates, in that several inflow lines for the heat transfer medium are provided which are arranged at a radial distance from the center of the circular plates, and in that the outflow lines for the evaporated medium and for the heat transfer medium are arranged in the area of the circumference of the circular plates.

The circular construction of the plates and the arrangement of the inflow lines for the medium to be evaporated, and for the heat transfer medium in the area of the center of the plates and of the pertaining outflow lines in the area of the plate circumference leads to a flow from the inside to the outside through the respective spaces. This results in a volume increase in the radial flow direction and thus has the effect that the flow rate becomes uniform despite the volume increase and the pressure loss is therefore reduced.

If a burnable gas is used as the heat transfer medium for the direct catalytic heating of the heat transfer medium space, the radial flow guidance of the burnable gas has the effect that, although the burnable gas depletes toward the circumference, the dwell time is simultaneously increased, so that, on the whole, higher conversion rates can be reached.

The arrangement of one inflow line respectively for the heat transfer medium precisely between the inflow line and the outflow line for the gas to be evaporated leads to an optimal heat transfer because, after entering the evaporation space, the medium to be evaporated must flow around the inflow line for the heat transfer medium. In the area of the inflow line for the heat transfer medium, the available amount of heat is the largest. Simultaneously, the heat requirement in the medium to be evaporated is the largest immediately after the entry since there the energy is converted for the phase transition. Thus the most heat is provided where it is also needed.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
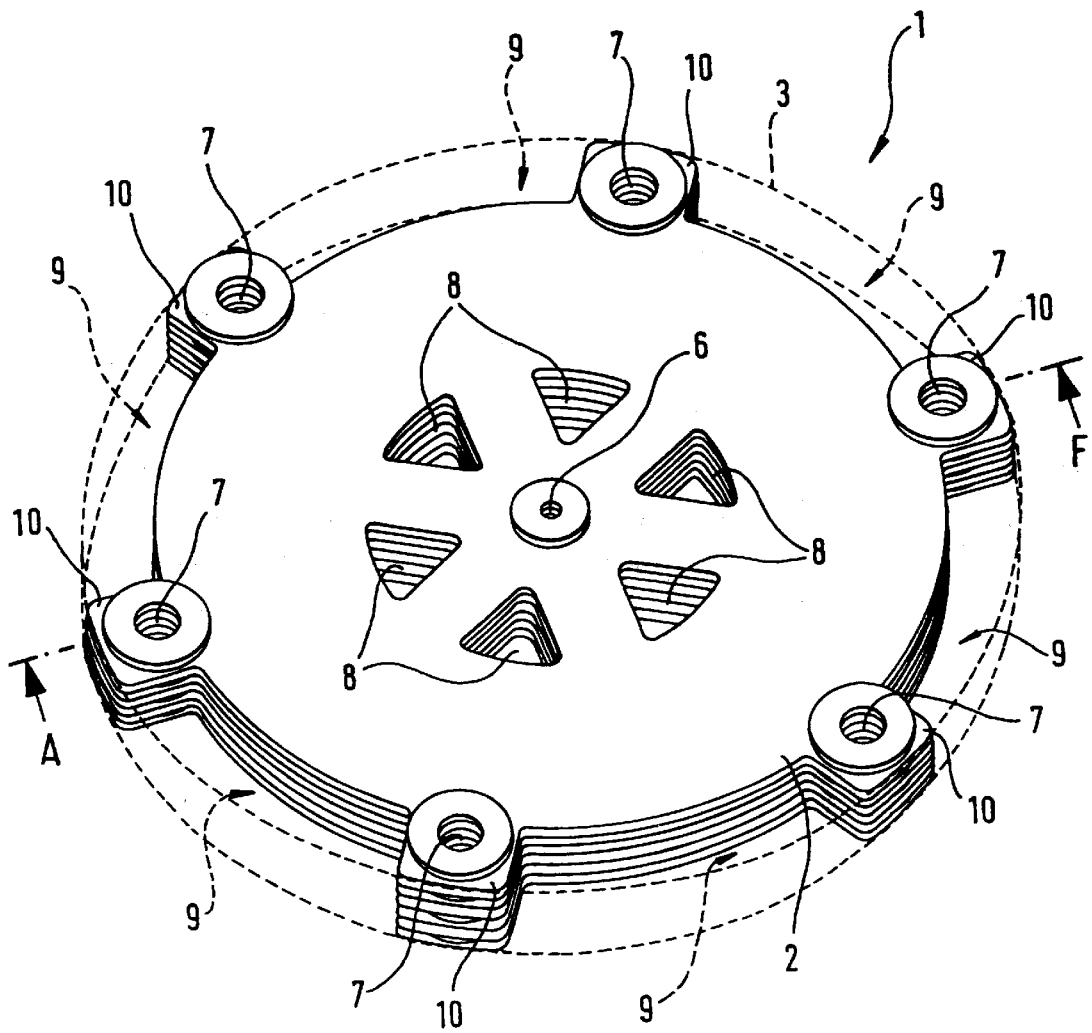
FIG. 1 is a perspective view of the plate construction of a evaporator unit according to the present invention.

The evaporator unit is designated generally by the reference numeral 1 and has a plurality of essentially circular plates 2. The plate stack is normally closed off by two end plates (not shown). In addition, the plate stack is bounded toward the outside by a housing 3. However, for reasons of clarity, the housing 3 is illustrated in FIG. 1 by a dashed line.

Evaporation spaces 4 and heat transfer medium spaces 5 are formed in an alternating manner between the adjacent plates 2. For the feeding and discharging of the medium to be evaporated and of the heat transfer medium, corresponding inflow and outflow lines 6 to 9 are provided which extend in the stacking direction through the evaporator unit 1. For this purpose, identical recesses are arranged in all plates 2.

In each substantially circular plate 2, a recess for forming the inflow line 6 for the medium to be evaporated is provided in the central area. In addition, on the circumference of the plates, several projections 10 are preferably arranged in a circularly symmetrical manner. In each of these projections 10, a recess is provided for forming the outflow lines 7 for the evaporated medium. Furthermore, between the inflow line and the outflow line 6, 7 for the medium to be evaporated and at a radial distance from the inflow line 6, one recess respectively is provided for forming the inflow line 8 for the heat transfer medium. The outflow lines 9 for the heat transfer medium are finally formed by the spaces between the plates 2 and the housing 3.

Figure 2:
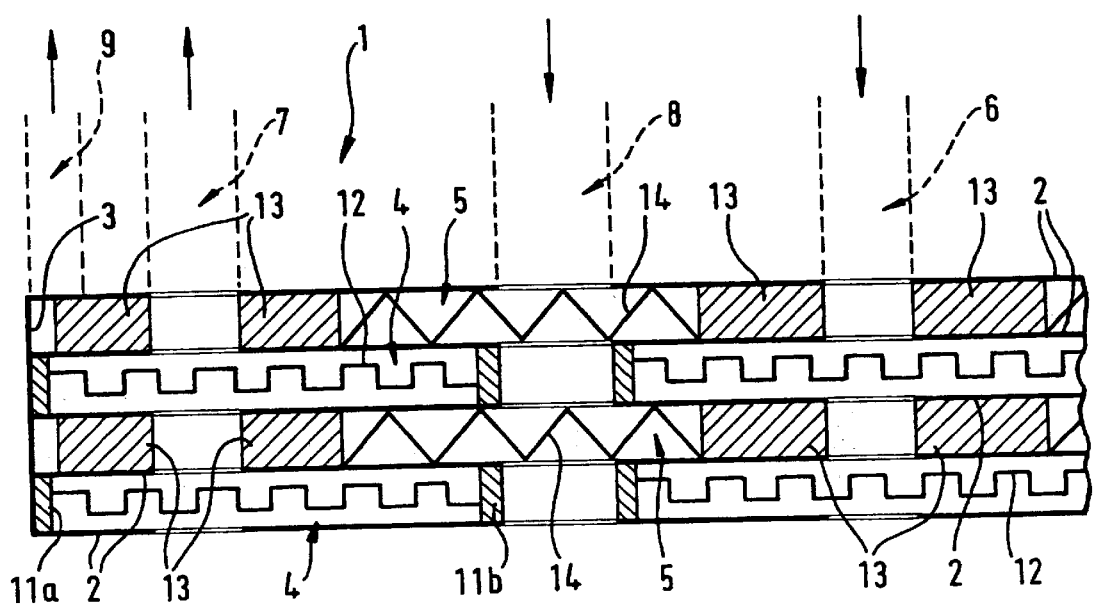
FIG. 2 is a sectional view of the evaporator unit along line A–F in FIG. 1.

FIG. 2 illustrates the basic construction of such an evaporator unit 1. During the assembly of the evaporator unit 1, two plates 2 respectively are connected with one another, preferably by soldering. A soldered joint 11a extends along the entire circumference of the plates 2. In addition, all recesses for the inflow lines 8 for the heat transfer medium are completely surrounded by another soldered joint 11b. Thus, a closed-off evaporation space 4 is formed between the two plates 2 and is in a flow connection only by way of the recesses for the inflow line 6, 7 and outflow line for the medium to be evaporated.

In the evaporation spaces 4, duct structures may be provided for the distribution of the medium. In FIG. 2 such a duct structure 12 is schematically illustrated. However, this structure is not absolutely necessary. Furthermore, in practice, the ducts would preferably extend in the radial direction.

The plate pairs 2, which were soldered together in this manner, are now stacked upon one another with the insertion of ring-shaped spacers 13. The spacers 13 each surround the recesses for the inflow and outflow lines 6, 7 for the medium to be evaporated and are thus a component of the inflow and outflow lines 6, 7. In addition to the spacers, structures 14 may be inserted for the distribution of the heat transfer medium. In FIG. 2, such structures are illustrated schematically. However, they are also not absolutely necessary. During the stacking, heat transfer medium spaces 5 are therefore formed between the plate pairs 2. These heat transfer medium spaces 5 are not in a flow connection with the inflow and outflow lines 6, 7 for the medium to be evaporated.

During operation, the medium to be evaporated is now introduced through the inflow line 6, which extends essentially along the center of the circular plates 2, into the evaporator unit 1. The medium flows by way of the corresponding recesses into the evaporation spaces 4. The spacers 13 between the plate pairs 2 prevent the medium from also flowing into the heat transfer medium spaces 5. Inside the evaporation spaces 4, the medium flows from the inside to the outside and in the process is evaporated by the thermal energy transmitted from the heat transfer mediums spaces 5. The volume of the medium increases during the evaporation. Simultaneously, however, the available flow volume also increases in the axial direction so that, despite the temperature increase and the evaporation, the flow rate becomes more uniform and causes a reduction of the pressure loss.

The thermal energy required for the evaporation and possibly for the overheating is provided by the heat transfer medium spaces 5. The provision of the heat can be carried out in different ways. On one hand, a hot heat transfer medium such as thermo-oil, can flow through the heat transfer medium spaces 5. For this purpose, the heat transfer medium is brought into the evaporator unit 1 through the inflow lines 8 and then flows by way of the corresponding recesses into the heat transfer medium spaces 5. By way of the soldered joints 11*b* in the area of these recesses, the heat transfer medium is preventing from flowing into the evaporation spaces 4. The heat transfer medium flows through the heat transfer medium spaces also in the radial direction from the inside to the outside and is then discharged by way of the corresponding outflow line 9.

However, the heat can also be generated directly in the heat transfer medium spaces 5. For this purpose, instead of the thermo-oil, a burnable gas is introduced as the heat transfer medium into the heat transfer medium spaces 5 and is directly catalytically burned there. For this purpose, a suitable material, for example a precious-metal-containing catalyst material in bulk form or as a coating, is provided in the heat transfer medium spaces 5. The oxidant, preferably atmospheric oxygen, required for the catalytic burning can be admixed to the burnable gas or can be fed directly into the heat transfer medium space 5.

In both cases, the maximal thermal energy is provided in the area of the inflow lines 8, while it decreases radially toward the outside. When a thermo-oil is used, this is the result of the cooling along the radial running length. In direct catalytic heating, the burnable gas is correspondingly depleted along the radial running length so that the reaction rate and thus the provided thermal energy decreases. Simultaneously, the dwell time of the depleted burnable gas also increases because of the volume increase to achieve, on the whole, a better energy utilization and thus a higher conversion rate.

Furthermore, this arrangement has the advantage that the largest amount of energy is made available precisely where it is needed. The largest energy demand occurs at the phase transition of the medium to be evaporated, i.e. in the entry area. The largest amount of energy is, however also provided there because the thermo-oil still has the highest temperature when entering the heat transfer medium space 5, or the fed burnable oil is still highly enriched.

As the result of the arrangement of the inflow lines 8 for the heat transfer medium precisely between the inflow and outflow lines 7 for the medium to be evaporated, bypass flows and therefore a droplet formation in the evaporated medium are prevented. On its path from the inflow to the outflow line 6, 7, the medium to be evaporated must necessarily come in contact with the heat transfer medium because the direct radial flow path through the inflow line 8 for the heat transfer medium is blocked. Another advantage of this arrangement resides in the thermo-mechanical uncoupling of the plate stack in the direction of the normal plate line.

A preferred application example for such an evaporator unit is the evaporation of water and/or methanol in fuel cell systems for mobile applications, for example, for the use in motor vehicles. For this purpose, fuel cells are preferably used which have proton-conducting electrolyte membranes, so-called PEM fuel cells, the hydrogen required for this purpose being generated in the vehicle by water vapor reformation or partial oxidation. In both processes, the liquid must be evaporated before entry into the reformer and overheated to approximately 250° C. For the water vapor reformation, water vapor and methanol vapor are typically required at a mol ratio of 1:1 to 2:1, while during the partial oxidation, pure methanol vapor is used. Because mixed forms from both reactions can be implemented, however, a gas mixture with a mol ratio of 0–2 parts water vapor to one part methanol gas must generally be produced.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An evaporator unit comprising plates arranged in a plate stack such that evaporation spaces and heat transfer medium spaces respectively are formed between adjacent plates, and an inflow line and at least outflow line for a medium to be evaporated and for a heat transfer medium extending essentially perpendicularly to the plates, wherein the plates have a substantially circular configuration, the inflow line for the medium to be evaporated being arranged in a central area of the plates, and several inflow lines for the heat transfer medium being provided at a radial distance from a central area of the plates, and the outflow lines for the evaporated medium and for the heat transfer medium being arranged in a circumferential area of the circular plates.

2. The evaporator unit according to claim 1, wherein the heat transfer medium is one of a thermo-oil and a burnable oil for the direct catalytic heating of the heat transfer medium spaces.

3. The evaporator unit according to claim 1, wherein the inflow lines are arranged circularly symmetrically to the central area of the plates.

4. The evaporator unit according to claim 1, wherein several outflow lines for the evaporated medium are arranged circularly symmetrically in the circumferential area of the plate.

5. The evaporator unit according to claim 1, wherein an identical number of inflow lines for the heat transfer medium and of outflow lines for the evaporated medium are provided, and a respective inflow line for the heat transfer medium is arranged between the inflow line for the medium to be evaporated and an outflow line for the evaporated medium.

6. The evaporator unit according to claim 1, wherein the plate stack is arranged in a cylindrical housing without the plate stack, at least partial areas of a circumference of the plate stack, resting on the housing, and recesses thereby defined between the plate circumference and the housing constitute an outflow line for the heat transfer medium.

\* \* \* \* \*